United States Patent
Zhao et al.

(10) Patent No.: US 12,197,956 B2
(45) Date of Patent: Jan. 14, 2025

(54) APPLICATION OPTIMIZATION METHOD AND DEVICE, STORAGE MEDIUM, AND ELECTRONIC EQUIPMENT

(71) Applicant: HUIZHOU TCL MOBILE COMMUNICATION CO., LTD., HuiZhou (CN)

(72) Inventors: Ziyuan Zhao, HuiZhou (CN); Zhaojun Yang, HuiZhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 268 days.

(21) Appl. No.: 17/620,701

(22) PCT Filed: Dec. 19, 2019

(86) PCT No.: PCT/CN2019/126721
§ 371 (c)(1),
(2) Date: Dec. 19, 2021

(87) PCT Pub. No.: WO2021/114357
PCT Pub. Date: Jun. 17, 2021

(65) Prior Publication Data
US 2022/0300328 A1  Sep. 22, 2022

(30) Foreign Application Priority Data
Dec. 11, 2019 (CN) .......................... 201911263600.6

(51) Int. Cl.
*G06F 9/46* (2006.01)
*G06F 9/48* (2006.01)
*G06F 9/50* (2006.01)

(52) U.S. Cl.
CPC .............. *G06F 9/505* (2013.01); *G06F 9/485* (2013.01); *G06F 9/5016* (2013.01)

(58) Field of Classification Search
CPC ......... G06F 9/505; G06F 9/485; G06F 9/5016
See application file for complete search history.

(56) References Cited

U.S. PATENT DOCUMENTS

| 10,585,587 B2 | 3/2020 | Noguchi et al. |
| 2009/0113444 A1 | 4/2009 | Hackborn et al. |

FOREIGN PATENT DOCUMENTS

| CN | 104484265 A | 4/2015 |
| CN | 104881493 A | 9/2015 |

(Continued)

OTHER PUBLICATIONS

International Search Report and the Written Opinion Dated Sep. 15, 2020 From the International Searching Authority Re. Application No. PCT/CN2019/126721 and Its Translation of Search Report Into English (2 Pages).

(Continued)

*Primary Examiner* — Diem K Cao
(74) *Attorney, Agent, or Firm* — Rivka Friedman

(57) ABSTRACT

An application optimization method, a storage medium, and an electronic equipment are provided, wherein the method is applied to the electronic equipment executing following steps: determining an application to be optimized in the electronic equipment through a system process; obtaining a count of interface switches of the application to be optimized; when the count of interface switches of the application to be optimized is greater than a predetermined count, obtaining a data volume of a file of the application to be optimized; and when the data volume is greater than a preset threshold, optimizing the file of the application to be optimized. The application is not required to wait for 24 hours before optimization, and can be optimized promptly according to the condition of the application, so the optimization efficiency of the application is improved, and the performance of the application is also improved.

19 Claims, 5 Drawing Sheets

(56) References Cited

FOREIGN PATENT DOCUMENTS

| CN | 106250180 | A | * | 12/2016 | ............. G06F 9/445 |
|----|-----------|---|---|---------|------------------------|
| CN | 106371913 | A |   | 2/2017  |                        |
| CN | 107844429 | A |   | 3/2018  |                        |
| CN | 108519916 | A |   | 9/2018  |                        |
| CN | 108536488 | A | * | 9/2018  | ......... G06F 9/44505 |
| CN | 108804138 | A |   | 11/2018 |                        |
| CN | 108804231 | A |   | 11/2018 |                        |
| CN | 109240881 | A |   | 1/2019  |                        |
| CN | 109284179 | A |   | 1/2019  |                        |
| CN | 109324983 | A |   | 2/2019  |                        |
| CN | 109522034 | A | * | 3/2019  | ............... G06F 8/65 |
| CN | 109697088 | A |   | 4/2019  |                        |
| CN | 110134655 | A |   | 8/2019  |                        |

OTHER PUBLICATIONS

First Office Action and Search Report Dated Nov. 2, 2020, for Huizhou TCL Mobile Communication Co., Ltd., from China Application No. 201911263600.6 and Its Translation of Office Action Into English (6 pages).

Notice of Allowance and Search Report Dated Jun. 3, 2021, for Huizhou Tcl Mobile Communication Co., Ltd., from China Application No. 201911263600.6 and Its Translation of Office Action Into English (2 pages).

* cited by examiner

APPLICATION OPTIMIZATION METHOD AND DEVICE, STORAGE MEDIUM, AND ELECTRONIC EQUIPMENT

CROSS REFERENCE TO RELATED APPLICATIONS

The application is a national phase of the PCT application No. PCT/CN2019/126721 filed on Dec. 19, 2019, which claims priority to the patent application filed on Dec. 11, 2019 with the National Intellectual Property Administration, application No. 201911263600.6, titled "Application Optimization Method and Device, Storage Medium, and Electronic Equipment," which is incorporated by reference in the present application in its entirety.

BACKGROUND

The present application relates to the field of data storage technologies, and in particular, to an application optimization method, an application optimization apparatus, a storage medium, and an electronic equipment.

With rapid development of intelligent terminal technologies, more and more applications (APPs) can be employed on electronic equipment such as smartphones and tablet computers. As a mainstream operating system on the current electronic equipment, the ANDROID system records classes and methods used by a current application while carrying out a process, keeps recorded classes (class) and methods (method) in a file such as primary.prof, and optimizes the file. In a conventional optimization method, a system detects whether an electronic equipment is in both a charging state and an idle state. If so, optimization of applications is commenced. Otherwise, the smart terminal is detected again after 24 hours. As such, the detection repeats every 24 hours until the status is detected to be both in the charging state and the idle state, so that the optimization of applications can then be processed.

In view of the above-mentioned prior art optimization methods, the optimization is performed only once every 24 hours and, in some cases, even longer. For example, since the detection of the state of the electronic equipment is performed at intervals of 24 hours, user habits usually keep the electronic equipment away from both the charging and idle states except for perhaps just a short moment of the day. Hence, the detection could not be triggered, as the system cannot detect that the electronic equipment is in both the charging and idle states, causing the pending optimization processes to be indefinitely held off.

SUMMARY

Embodiments of the application provides an application optimization method, an application optimization apparatus, a storage medium and an electronic equipment, which can improve the optimization efficiency of an application and improve the performance of the application.

An embodiment of the application provides an application optimization method applicable for an electronic equipment, comprising the following steps.

A system process determines an application to be optimized in the electronic equipment. A count of interface switches of the application to be optimized is obtained.

When the count of interface switches of the application to be optimized is greater than a predetermined count, a data volume of a file of the application to be optimized is acquired.

When the data volume is greater than a preset threshold, the file to be optimized is optimized so as to achieve optimization of the application to be optimized.

In an embodiment, before the step of calling an optimization interface through the system process, the following steps are processed. It is detected whether a file in another application is in the middle of optimization, and if the detecting is positive, an optimization task is generated for the file of the application to be optimized, and the optimization task is written into a waiting queue.

When optimization of the file in another application is identified as completed, the optimization task for the file of the application to be optimized is obtained from the waiting queue, and the step of calling an optimization interface through the system process is executed.

In a further embodiment, when the step of determining an application to be optimized in the electronic equipment is executed, the application to be optimized in the electronic equipment is determined from a list of applications pending optimization, through the system process.

After optimization of the file of the application to be optimized, further steps are executed as follows.

An amount of available memory of the electronic equipment is acquired.

It is decided whether to continuously optimize an optimized application according to the amount of available memory of the electronic equipment.

If the decision is negative, an entry corresponding to the optimized application is removed from the list of applications pending optimization.

In an alternative embodiment, it is detected whether an instruction to remove for the application to be optimized is received.

If the detection is negative, an entry corresponding to the application to be optimized is removed from the list of applications pending optimization based on the remove instruction.

A further embodiment of the present application provides an application optimization apparatus applicable to an electronic equipment, comprising the following elements.

An application determination unit is configured for determining an application to be optimized in the electronic equipment through a system process.

An interface switch unit is configured for counting interface switches of the application to be optimized.

A data volume calculator unit is configured for obtaining a data volume of a file of the application to be optimized when the count of interface switches of the application to be optimized is greater than the predetermined count.

An optimization unit is configured for optimizing the file of the application to be optimized when the data volume is greater than a preset threshold so as to achieve optimization of the application.

In a further embodiment, the application optimization apparatus may further comprise a call detection unit, a counter unit and a counter reset unit.

The call detection unit is configured for detecting whether the current called interface of the application to be optimized is different from the last called interface of the application to be optimized through the process of the application to be optimized.

The counter unit is configured for incrementing the count of interface switches of the application by 1 if the currently called interface of the application to be optimized is different from a last called interface, and this is how the count of interface switches of the application to be optimized is counted.

The counter reset unit is configured for resetting the count of interface switches of the application to be optimized through the corresponding process before or after optimizing the file of the application to be optimized.

An alternative embodiment of the interface switch unit comprises an application process access unit and a switch counter unit.

The switch counter unit is configured for incrementing the count of interface switches of the application to be optimized through the process of the application to be optimized when the process of the application to be optimized detects that the interface of the application to be optimized is switched/changed.

The application process access unit is configured for passing the count of interface switches corresponding to an application to be optimized to the system process, serving as one possible approach for the system process to access the count of interface switches.

In a specific embodiment, the optimization unit further comprises an interface caller unit, a file reader unit, and a file optimization unit.

The interface caller unit is configured for calling the optimized interface through the system process.

The file reader unit is configured for reading the file of the application to be optimized by utilizing the optimization interface.

The file optimization unit is configured for optimizing the file to be optimized.

In a further embodiment, the optimization unit further comprises an optimization detection unit, a task generation unit, a write queue unit, and a task acquisition unit.

The optimization detection unit is configured for detecting whether a file in another application to be optimized is in the middle of optimization.

The task generating unit is configured for generating an optimization task for the file of the application to be optimized if the optimization detection units detects an ongoing optimization process for the file in another application.

The write queue unit is configured for writing the optimization tasks of the application to be optimized into a waiting queue.

The task acquisition unit is configured for obtaining the optimization task for the application to be optimized from the waiting queue after detecting that the optimization of the file in another application is completed, and then triggering the interface caller unit.

In an embodiment, an application determination unit is configured to determine, through a system process, from a list of applications pending optimization, an application to be optimized in the electronic equipment. The application optimization apparatus may further comprise a memory control unit, an optimization determination unit, and an application removal unit 308.

The memory control unit is configured to count an amount of available memory of the electronic equipment.

The optimization determination unit is configured to determine whether to continue optimizing an optimized application according to the amount of available memory of the electronic equipment.

An application removal unit is configured to remove an entry corresponding to an application from the list of applications pending optimization if optimization of the application is determined to be stopped.

In a further embodiment, the application optimization apparatus further comprises an instruction detection unit and an application removal unit.

The instruction detection unit is configured for detecting whether an instruction to remove of the application to be optimized is received.

The application removal unit is configured for removing an entry corresponding to an application from the list of applications pending optimization accordingly upon reception of an instruction to remove corresponding to the application.

A further embodiment of the application provides a computer-readable storage medium, wherein a plurality of instructions are stored in the computer-readable storage medium, and the instructions are suitable for being loaded by a processor to execute any embodiment of the application optimization methods.

A further embodiment of the present application provides an electronic equipment, which includes a processor and a memory, where the processor is electrically connected to the memory, the memory is used to store instructions and data, and the processor is used in any one of the steps of the application optimization method described above.

According to the application optimization method, the application optimization device, the storage medium and the electronic equipment, the count of interface switches of the application to be optimized is concerned. When the count of interface switches of the application to be optimized is greater than the predetermined count, a data volume of a file of the application to be optimized is calculated. When the data volume of the file is greater than a preset threshold, optimization is performed on the file of the application to be optimized. Whether the file of the application is optimized or not is determined according to the count of interface switches of the application and the data volume of the file to be optimized. Therefore, the application does not need to wait for 24 hours before optimization. The application can be optimized in real time according to the use condition of the application, the optimization efficiency of the application is improved, and the performance of the application is also improved.

BRIEF DESCRIPTION OF THE DRAWINGS

The technical solution and other advantages of the present application will become apparent from the detailed description of the embodiments of the present application with reference to the accompanying drawings.

DETAILED DESCRIPTION

The technical solution in the embodiments of the present application will be clearly and completely described below with reference to the drawings in the embodiments of the present application, and it is obvious that the described embodiments are only a part of the embodiments of the present application, and not all of the embodiments. All other embodiments, which can be derived by a person skilled in the art from the embodiments given herein without making any creative effort, shall fall within the protection scope of the present application.

The embodiments of the application provide an application optimization method and device, a storage medium, and electronic equipment. Any one of the application optimization devices provided by the embodiments of the present application can be integrated to an electronic equipment, and the electronic equipment may include a smartphone, a tablet computer, a PC, and the like. The electronic equipment comprises at least one third-party application, wherein the third-party application refers to an application that is not present in the equipment at the time of its production, such as an application downloaded from a third-party platform, e.g., a browser. The third-party application needs to be optimized after installation onto the electronic equipment. It should be noted that any application of the electronic equipment system that is provided by the factory has already been optimized when the electronic equipment system is shipped from the factory. If an application of the electronic equipment system that is shipped from the factory has not been optimized, the application also falls within the scope of the application of the embodiments of the present application.

It should be noted that, when each application runs in the electronic equipment, a process of the application is generated. If there is no process of the application in the electronic equipment, it means that the application is not currently running in the electronic equipment. If the application is not running in the electronic equipment, the process of optimizing the application is not triggered. Multiple applications running in the electronic equipment will result in multiple different processes. Meanwhile, it should be noted that each electronic equipment should have a corresponding system process.

Figure 1:
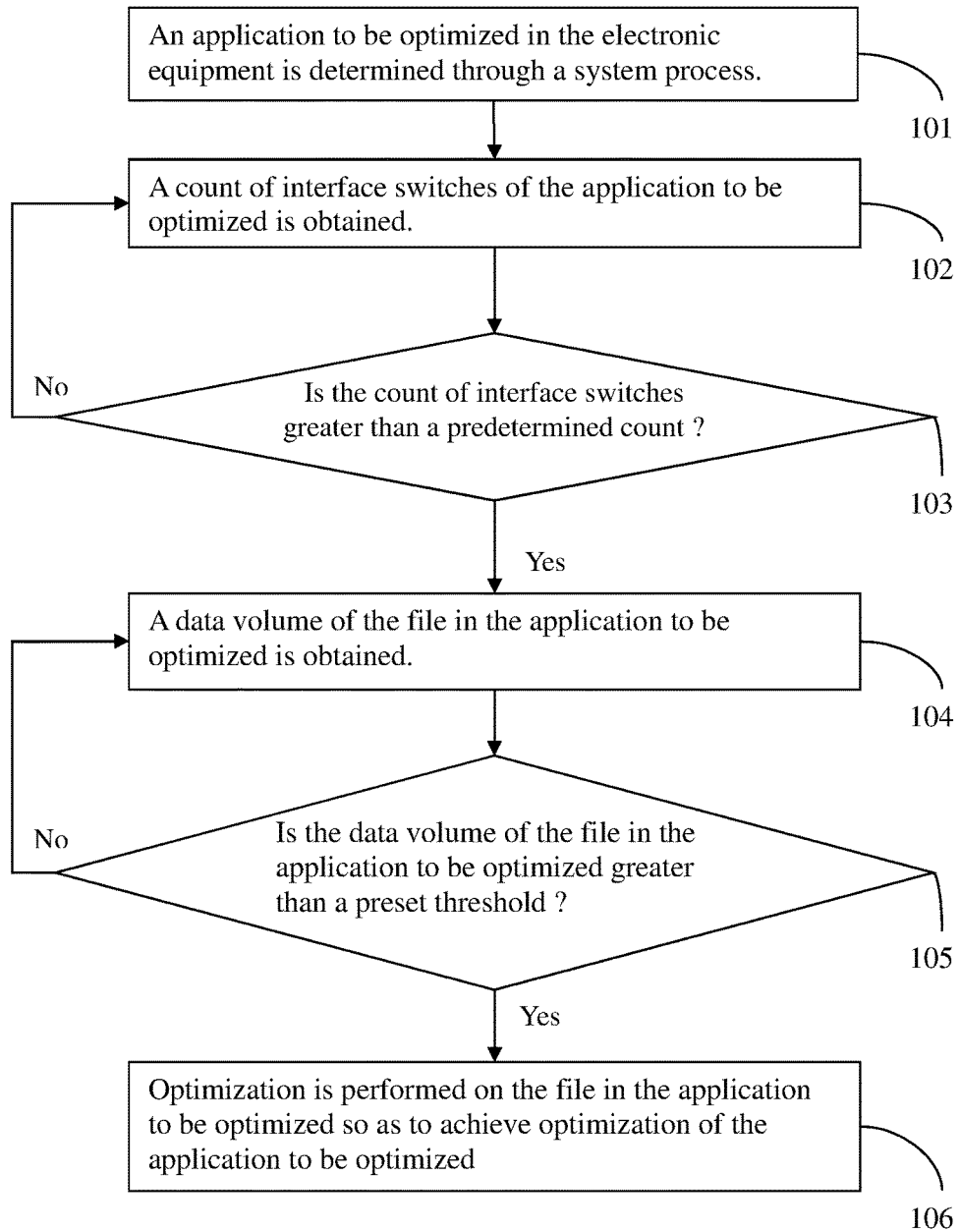
FIG. 1 is a schematic flowchart of an application optimization method according to an embodiment of the present disclosure.

Referring to FIG. 1, FIG. 1 is a flowchart illustrating an application optimization method according to an embodiment of the present disclosure, which is applied to an electronic equipment including at least one third-party application. The application optimization method comprises steps 101 to 106, and the specific flow can be as follows.

101, an application to be optimized in the electronic equipment is determined through a system process.

The electronic equipment detects whether an application installation instruction is received. If so, upon completion of the application installation, the information of the application, such as the name of the application, the package name of an application data package, etc., is acquired, and the information of the application is recorded into a record file.

Thus, step 101 involves: an application to be optimized in the electronic equipment determined from a list of the applications to be optimized through a system process, specifically, through the following steps: a record file is acquired through a system process; a list of applications pending optimization is acquired in the record file, wherein the list of applications pending optimization comprises information on each application to be optimized. The application to be optimized in the electronic equipment is determined from the list of applications pending optimization. It should be noted that the applications to be optimized in the list of applications pending optimization include both currently running applications and currently non-running applications. Therefore, determination of the application to be optimized in the electronic equipment from the list of applications pending optimization includes: detecting whether the applications in the list of applications pending optimization have established corresponding processes through the system process determining the applications having corresponding processes as applications to be optimized, and not determining applications without corresponding processes to be applications to be optimized.

Since data of the applications to be optimized is stored in the record file, when a shutdown instruction of the electronic equipment is received, the record file is written into the configuration of the electronic equipment and exists as a configuration file, so that the data of the applications to be optimized stored in the record file is persisted. For example, upon detection of a user clicking a key or button related to "power off", a "power off" command for the electronic equipment is generated. The data of the application to be optimized stored in the log file may also be persisted in other ways. When a "boot up" command of the electronic equipment is received, the record file is loaded from the configuration of the electronic equipment, and the data of the applications to be optimized is acquired therefrom. For example, if the electronic equipment is detected to be turned on, a boot up command of the electronic equipment is generated. The log file may also be loaded from the configuration of the electronic equipment when detecting that the optimization of the application is triggered, so that the data of the application to be optimized is obtained from the log file.

102, a count of interface switches of the application to be optimized is acquired.

An interface switching means that an interface being called currently is different from the interface called previously. Specifically, in step 102, the count of interface switches of the application to be optimized is acquired through the system process. The count of interface switches of the application to be optimized is stored within and counted by the application to be optimized. In order to ensure data independency, safety, etc. of each application, the electronic equipment system is configured to keep two independent processes from communicating with each other. Therefore, the system process cannot directly acquire the count of interface switches of an application to be optimized. Specifically, an inter-process calling mechanism is employed to acquire the count of interface switches of the application to be optimized.

Specifically, a step of obtaining of the count of interface switches of the application to be optimized through the system process includes the following steps: The process of the application to be optimized is accessed through the system process, such as accessing the process of the application to be optimized through the system process by using an inter-process communication mechanism. The count of interface switches of the application to be optimized is acquired through the process of the application to be optimized.

Alternatively, the step of obtaining the count of interface switches of the application to be optimized through the system process may include the following steps: The process of the application to be optimized detects whether the count of interface switches of the application to be optimized is changed. If the process of the application to be optimized detects that the count of interface switches of the application to be optimized is changed, the count of interface switches of the application to be optimized is obtained by the process of the application to be optimized. The process of an application to be optimized is accessed through a system process to obtain the count of interface switches of the application to be optimized or, alternatively, the count of interface switches of the application to be optimized is sent to the system process after the count of interface switches of the application to be optimized is counted by the process of the application to be optimized, so this is how the count of interface switches of the application to be optimized is provided to the system process.

Figure 2A:
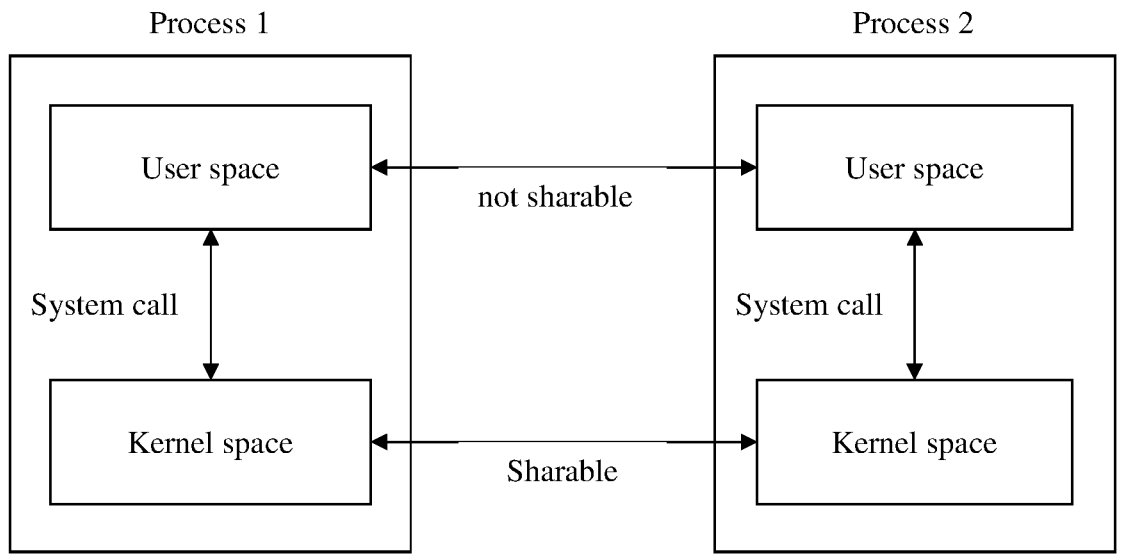
FIG. 2a is a schematic diagram of two processes provided in the embodiment of the present application.

A process space of each process comprises a kernel space and a user space, wherein codes and data of the kernel are stored in the kernel space, and codes and data of a user process are stored in the user space. Inside a process, access between the user space and the kernel space is referred to as a system call. Between different processes, data in the user space cannot be shared, whereas data in the kernel space is sharable. As shown in FIG. 2A, process 1 and process 2 are two different processes between which data in the user space is not sharable and data in the kernel space is sharable.

Figure 2B:
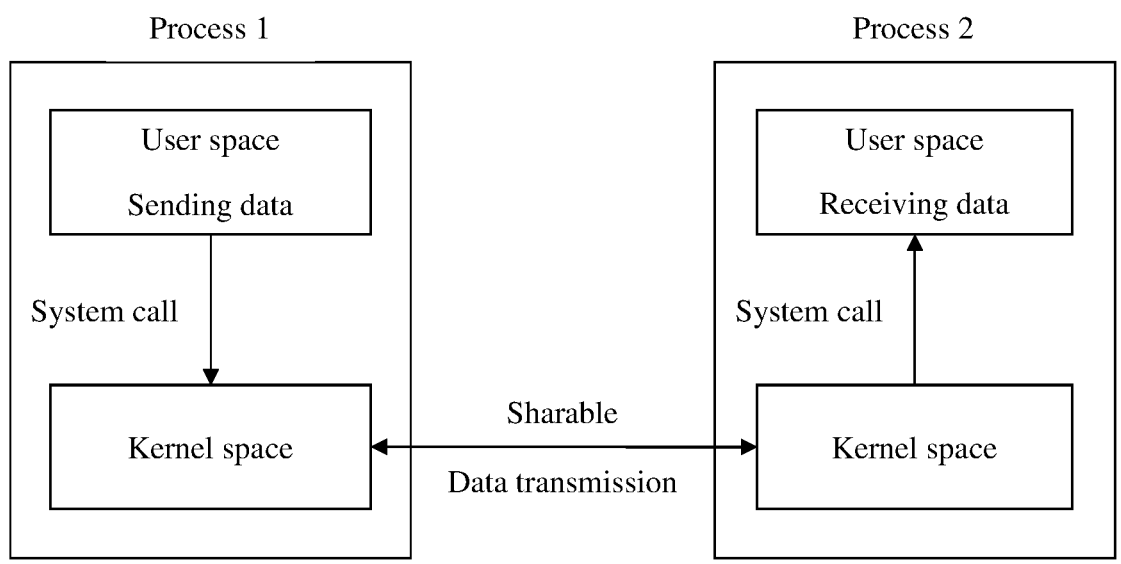
FIG. 2b is a schematic diagram of a data flow between two processes according to an embodiment of the present application.

The principle of an inter-process communication mechanism is implemented by firstly performing data exchange through the kernel space across different processes, and secondly performing data exchange through the user space and the kernel space inside a process, so that the inter-process user space data exchange is achieved. As shown in FIG. 2B.

In this way, the process of the application to be optimized is accessed by the system process using the inter-process communication mechanism, and specifically, the kernel space of the process of the application to be optimized is accessed by the kernel space of the system process using the inter-process communication mechanism. For example, a Binder inter-process communication mechanism can be used to act as a conduit to connect the kernel spaces of two processes. The count of interface switches of the application to be optimized are obtained through the process of the application to be optimized, specifically, the count of interface switches of the user space of the process of the application to be optimized is obtained through the kernel space of the process of the application to be optimized. The user space of the process of the application to be optimized sends the count of interface switches to the kernel space of the process of the application to be optimized. The kernel space of the process of the application to be optimized and the kernel space of the system process can share data, so the count of interface switches can be sent to the system process through the kernel space of the process of the application to be optimized.

Furthermore, before step 102, the step of application optimization further comprises the following steps: Through the process of the application to be optimized, it is detected whether a current called interface of the application to be optimized is different from a previous called interface of the application to be optimized. If they are different, an interface of the application to be optimized is assessed as changed/switched, that is, an interface switching is assessed as happened. Therefore, the count of interface switches of the application to be optimized is incremented by 1, and this is how the count of interface switches of the application to be optimized is obtained.

Taking the WECHAT log-in interfaces as an example, when WECHAT is executed, an Earth interface appears after clicking the login button, and a main interface is shown after entering WECHAT. The Earth and main interfaces are regarded as different interfaces called by WECHAT. If the interface is switched from the login interface to the earth interface, an interface switching has occurred, and the count of interface switches is incremented by 1. The count of interface switches is further incremented by 1 when the Earth interface switches to the main interface.

It is understood that when an application calls different interfaces, the corresponding classes and methods are called and recorded in a file, such as a primary.prof. The more different interfaces are called, the more classes and methods are called, and the more data is recorded.

103, it is determined whether the count of interface switches of the application to be optimized is greater than a predetermined count.

The predetermined count can be determined according to an empirical value or according to a specific situation of the current application; for example, 8 times, 10 times, etc. The predetermined count of different applications to be optimized can be the same or different. The type of the application to be optimized can also be obtained, and different predetermined counts are determined according to the types of the applications to be optimized. For example, the predetermined count of the application to be optimized of the instant messaging class is 10 times, and the predetermined count of the application to be optimized of the shopping class is 5 times.

If the count of interface switches of the application to be optimized is greater than the predetermined count, step 104 is performed. If the count of interface switches of the application to be optimized is not greater than the predetermined count, step 102 is performed to obtain the count of interface switches of the application to be optimized.

104, a data volume of the file of the application to be optimized is obtained.

A file of the application to be optimized refers to a document keeping records of the classes and methods used by the application to be optimized, such as primary.prof. Obtaining a data volume of the file of the application to be optimized can be simply understood as obtaining a file size of the file of the application to be optimized.

Specifically, the data volume of the file of the application to be optimized is obtained through a system process by using an inter-process communication mechanism.

105, it is determined whether the data volume of the file of the application to be optimized is greater than a preset threshold.

The preset threshold may be determined according to an empirical value or according to a specific situation of the current application; for example, 40 kb, 30 kb, etc. The preset thresholds of different applications to be optimized may be the same or different. The type of the application to be optimized can also be obtained, and different preset thresholds are determined according to the types of applications to be optimized. For example, the preset threshold of the application to be optimized for an instant messaging class is 20 kb, and the preset threshold of the application to be optimized for an editing class is 10 kb. Alternatively, by obtaining the amount of available memory of the electronic equipment, the preset threshold is determined accordingly. If the available memory of the electronic equipment is smaller, the value set by the preset threshold is reduced.

If the data volume of the file of the application to be optimized is greater than the preset threshold, step 106 is performed. If the data volume of the file of the application to be optimized is not greater than the preset threshold, step 104 is performed to obtain the data volume of the file of the application to be optimized, wherein step 104 may be executed at a preset interval. It can be understood that the greater the data volume of the file to be optimized is, the more data is recorded, which means the classes and methods recorded in the file have higher possibilities to be called; hence, the file is more likely to need an optimization to improve the performance of the application. If the data volume of the file to be optimized reaches the preset threshold, optimization is performed on the file.

106, optimization is performed on the file of the application to be optimized so as to achieve optimization of the application to be optimized.

Specifically, step 106 comprises the following steps: An optimization interface is called through a system process. A file to be optimized is read by utilizing the optimization interface, and optimization is performed on the file to be optimized. Through the optimization interface, the file to be optimized in the process of the application to be optimized is read by using an inter-process communication mechanism, and the file to be optimized is read into a memory. The optimization of the file to be optimized is performed through a system process. Specifically, the file to be optimized is subjected to dex optimization to obtain an optimized file, such as an odex file. The dex optimization can be implemented so that the classes and methods in the file to be optimized are converted into indexes to facilitate searching, and the indexes are converted into bytecodes and written into an optimized file. A bytecode is in a format that can be executed by the electronic equipment (without recompilation), such as binary code.

Furthermore, before the optimization interface is called by the system process, the following steps are performed: It is detected whether a file in another application to be optimized is in the middle of optimization. If so, an optimization task for the file of the application to be optimized is generated and written into a waiting queue. The optimization task for the application to be optimized is obtained from the waiting queue for optimization after the optimization of the file in another application is detected to be completed. Conversely, if no other application is being optimized, a step of calling an optimization interface is performed through a system process. Alternatively, if another application is being optimized, the pending optimization of the application is canceled until a next optimization is triggered. When the next optimization is triggered, the step of calling the optimization interface is performed through the system process, and the file to be optimized is read by using the optimization interface, and optimization is performed on the file to be optimized. It can be understood that the system process can only optimize one file in applications to be optimized at a time.

Furthermore, after the optimization interface is utilized to read and optimize the file of the application to be optimized, the following steps are performed: The file of the application after optimization is emptied, so that classes and methods being called in subsequent running processes of applications to be optimized can be recorded, and as subsequent optimization is performed by only optimizing subsequently called classes and methods, the data volume of optimization is reduced, and the optimization speed can be improved. After the subsequently called classes and methods are optimized, the optimized classes and methods are appended to the end of the optimized file, such as to the end of an odex file, so that the data volume of the optimized file is continuously increased.

Furthermore, before or after performing step 106, the application optimization method comprises further steps: The count of interface switches of the application to be optimized is reset by the process of the application to facilitate the counting of the next round of count of interface switches.

After a file of the application to be optimized is optimized, in the process of cold start or execution of the application to be optimized, the required classes and methods are directly obtained from the optimized file according to the indexes. Since the required classes and methods do not need to be loaded and compiled again, the cold start and execution of the optimized application are accelerated. The required classes and methods are acquired according to the indexes, which further accelerates the cold start and performance of the optimized application.

The embodiments of the current application determine whether the file to be optimized has been optimized according to the count of interface switches of the application and the data volume of the file to be optimized. Therefore, optimization of the application is not required to wait for 24 hours, and the application can be promptly optimized according to the condition of the application. In some conditions, the application can be optimized almost in real time. The optimization efficiency of the application is improved, as is the performance of the application, allowing a user to experience the optimized speed instantly.

Figure 3:
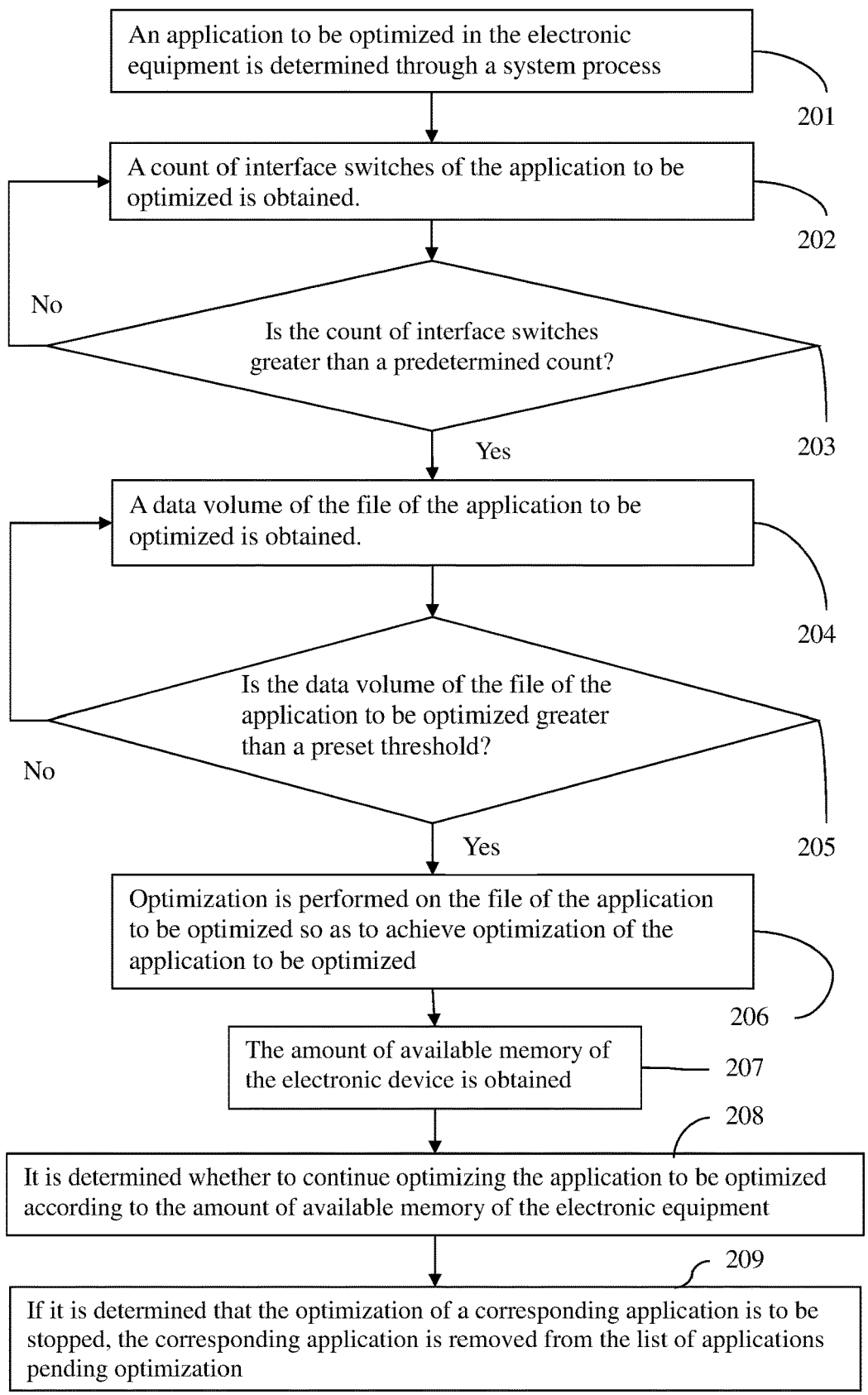
FIG. 3 is another schematic flowchart of an application optimization method according to an embodiment of the present disclosure.

FIG. 3 is another schematic flow chart of the application optimization method according to the embodiments of the present application. The application optimization method is applied to the electronic equipment. The application optimization method comprises the following steps 201-209, and the specific steps can be as follows.

201, an application to be optimized in the electronic equipment is determined through a system process.

202, count of interface switches of the application to be optimized is acquired.

203, it is determined whether the count of interface switches of the application to be optimized is greater than a predetermined count.

204, a data volume of the file of the application to be optimized is obtained.

205, it is determined whether the data volume of the file of the application to be optimized is greater than a preset threshold.

206, optimization is performed on the file of the application to be optimized so as to achieve optimization of the application to be optimized.

207, the amount of available memory of the electronic equipment is obtained.

The amount of available memory of the electronic equipment is obtained through a system process.

208, it is determined whether to continue optimizing the application to be optimized according to the size of available memory of the electronic equipment.

Specifically, step 208 comprises several steps: It is determined whether the amount of available memory of the electronic equipment is greater than a preset memory capacity. If it is greater than the preset memory capacity, optimization of the application is continuously performed. If the amount of available memory is less than the preset memory capacity, optimization is stopped after the application is optimized. It can be understood that, if the amount of available memory of the electronic equipment is large enough, the optimization of the application may be continuously performed, and if the amount of available memory of the electronic equipment is smaller, the optimization of the application to be optimized may be performed only once. If the amount of available memory of the electronic equipment is smaller, the optimization is performed once, so as to reduce the power consumption of the electronic equipment and the memory occupied by the optimization.

Furthermore, after determining that the amount of available memory of the electronic equipment is greater than the preset memory capacity, further steps are performed. A number of rounds of optimization of the application is determined. If the number of rounds of optimization of the application to be optimized does not reach a predetermined count, optimization of the application is continuously proceeded. If the number of rounds of optimization of the application to be optimized reaches the predetermined count, optimization of the application is stopped. It can be understood that, even if the amount of available memory of the electronic equipment is great enough, after the predetermined count of optimization, all classes and methods called by the application to be optimized have been optimized, so that there is no need to continue the optimization. After the predetermined count of optimization, optimization of the application can be stopped to reduce the power consumption of the electronic equipment.

209, if it is determined that the optimization of an application is to be stopped, the application is removed from the list of applications pending optimization.

That is, a record file comprising the list of applications pending optimization is obtained, and an entry corresponding to the application is removed from the list of applications pending optimization, so that the optimization of the application is no longer processed.

Wherein steps 201 to 206 are consistent with steps 101 to 106, refer to the corresponding description in steps 101 to 106, which will not be described again herein.

An embodiment further defines how to stop optimizing an application, so as to avoid repeated optimization of the application and reduce power consumption of the electronic equipment.

It can be understood that, the above application optimization method further comprises the following steps: It is determined whether an instruction to remove an application to be optimized is received. If an instruction to remove the application to be optimized is received, the application to be optimized is removed from the list of applications pending optimization according to the instruction to remove. Specifically, a record file is obtained, and the information corresponding to the application to be optimized in the record file is removed. It can be understood that, if the application to be optimized is removed, it is not necessary to optimize the application to be optimized, and the application to be optimized is directly removed from the list of applications pending optimization.

According to the method described in the previous embodiment, this embodiment will be further described from the perspective of an application optimization apparatus, where the application optimization apparatus may be specifically implemented as an independent entity, and may also be integrated in an electronic equipment, wherein the electronic equipment includes at least one third-party application, and the electronic equipment may include a mobile phone, a tablet computer, a PC, and the like.

Figure 4:
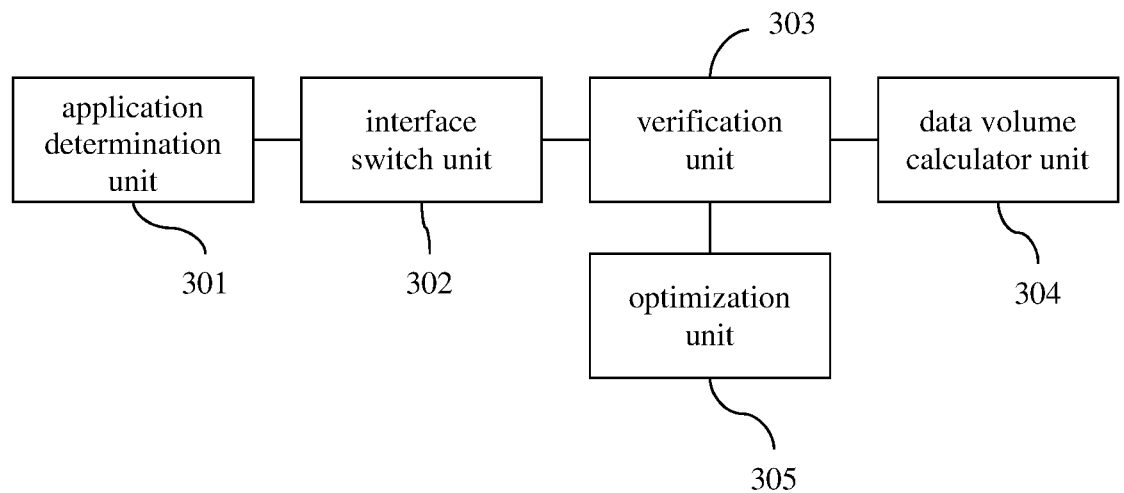
FIG. 4 is a schematic structural diagram of an application optimization apparatus according to an embodiment of the present application.

Referring to FIG. 4, FIG. 4 specifically illustrates an application optimization apparatus provided in an embodiment of the present application, which is applied to an electronic equipment including at least one third-party application, wherein the application optimization apparatus may include: an application determination unit 301, an interface switch unit 302, a verification unit 303, a data volume calculator unit 304, and an optimization unit 305, wherein:

The application determination unit 301 is configured to determine, through a system process, an application to be optimized in the electronic equipment.

The interface switch unit 302 is configured to obtain the count of interface switches of the application to be optimized, and the obtainment of the count of interface switches of the application to be optimized is through the system process.

Specifically, the interface switch unit 302 comprises an application process access unit and a switch counter unit. The application process access unit is configured for accessing the process of the application to be optimized through the system process. The switch counter unit is configured for obtaining the count of interface switches of the application to be optimized through the process of the application to be optimized.

Specifically, the interface switch unit 302 comprises an interface change detector unit, a switch counter unit, and an application process access unit. The interface change detector unit is configured for detecting whether there are any changes in the count of interface switches of the application to be optimized. The switch counter unit is configured for obtaining the count of interface switches of the application to be optimized through the process of the application to be optimized if the process of the application to be optimized detects that the count of interface switches of the application to be optimized is changed. The application process access unit is configured for accessing the process of the application to be optimized through the system process to obtain the count of interface switches of the application to be optimized. Alternatively, after the count of interface switches is obtained by the process of the application to be optimized, the process of the application sends the count of interface switches to the system process so that the count of interface switches of the application to be optimized is obtained by the system process.

The verification unit 303 is configured to determine whether the count of interface switches of the application to be optimized is greater than a predetermined count after the count of interface switches of the application to be optimized is obtained.

The data volume calculator unit 304 is configured to calculate/obtain a data volume of a file of the application to be optimized in the event that the count of interface switches of the application to be optimized is greater than a preset threshold. Specifically, the data volume of the file of the application to be optimized is obtained through a system process by using an inter-process communication mechanism.

The verification unit 303 is further configured to determine whether the data volume of the file of the application to be optimized is greater than a preset threshold after the data volume of the file of the application to be optimized is obtained.

The optimization unit 305 is configured to optimize the file of the application to be optimized when the data volume of the file of the application to be optimized is greater than a preset threshold, so as to achieve optimization of the application to be optimized.

Specifically, the optimization unit 305 further comprises: an interface caller unit, a file reader unit and a file optimization unit. The interface caller unit is configured for calling the optimization interface through the system process. The file reader unit is configured for reading the file of the application to be optimized by utilizing the optimization interface. The file optimization unit is configured for optimizing the file to be optimized.

Furthermore, the optimization unit 305 further comprises: an optimization detection unit, a task generation unit, a write queue unit, and a task acquisition unit. The optimization detection unit is configured for detecting whether a file in another application to be optimized is in the middle of optimization. The task generating unit is configured for generating an optimization task for the file of the application to be optimized if the optimization detection unit detects an ongoing optimization process for the file in another application. The write queue unit is configured for writing an optimization task of the application to be optimized into a waiting queue. The task acquisition unit is configured for obtaining the optimization task for the application to be optimized from the waiting queue, and then triggering the interface caller unit after detecting that the optimization of the file in another application to be optimized is completed. If a file in another application to be optimized does not exist, the interface caller unit is triggered. Alternatively, the optimization unit 305 further comprises: an optimization detection unit and an optimization cancellation unit, wherein the optimization detection unit is configured for detecting whether a file in another application to be optimized is in the middle of optimization, and the optimization cancelation unit is configured for canceling the optimization of the application to be optimized if a file in another application to be optimized is being optimized. The interface caller unit is triggered if a file in another application to be optimized does not exist.

Furthermore, the optimization unit 305 further comprises: a file cleaner unit, wherein the file cleaner unit is configured for emptying a file of the application to be optimized after the file is optimized.

Furthermore, the application optimization apparatus further comprises: a call detection unit, a counter unit, and a counter reset unit. The call detection unit is configured for detecting whether the current called interface of the application to be optimized is different from the previous called interface of the application to be optimized through the process of the application to be optimized. The counter unit is configured for incrementing the count of interface switches of the application to be optimized by 1 when detecting the current called interface of the application to be optimized is different from the previous called interface. The counter reset unit is configured for resetting count of interface switches of the application to be optimized through the process of the application before or after optimizing the file of the application to be optimized.

Figure 5:
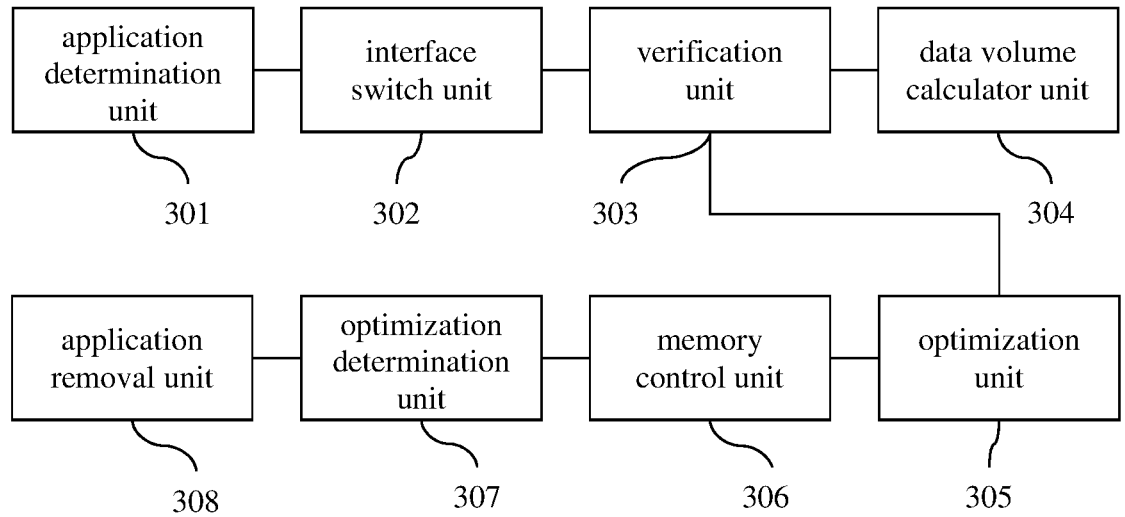
FIG. 5 is another schematic structural diagram of an application optimization apparatus according to an embodiment of the present disclosure.

FIG. 5 is an application optimization apparatus according to an embodiment of the present application, applicable to an electronic equipment including at least one third-party application, wherein the application optimization apparatus may comprise: an application determination unit 301, an interface switch unit 302, a verification unit 303, a data volume calculator unit 304, an optimization unit 305, a memory control unit 306, an optimization determination unit 307, and an application removal unit 308. For reference, the application determination unit 301, the interface switch unit 302, the verification unit 303, the data volume calculator unit 304, and the optimization unit 305 refer to the corresponding descriptions above, which will not be described again herein.

A memory control unit 306 is configured to count an amount of available memory of the electronic equipment.

An optimization determination unit 307, configured to determine whether to continue optimizing the optimized application to be optimized according to the amount of available memory of the electronic equipment.

An application removal unit 308 is configured to remove an entry corresponding to an application from a list of applications pending optimization if it is determined that optimization of the application is to be stopped.

Furthermore, the application optimization apparatus further comprises a call detection unit, a counter unit and a counter reset unit.

Furthermore, the above-mentioned application optimization apparatus further comprises an instruction detection unit and an application removal unit. The instruction detection unit is configured for detecting whether an instruction to remove sent from the application to be optimized is received. The application removal unit is configured for removing an entry corresponding to an application from the list of applications pending optimization accordingly upon reception of an instruction to remove an application.

In actual implementation, each of the aforementioned modules and/or units may be implemented as an independent entity, or they may be implemented as one or several entities by any combination thereof, wherein the specific implementation of each of the modules and/or units may refer to the above-mentioned method embodiments, and specific achievable beneficial effects also refer to the beneficial effects in the above-mentioned method embodiments, which will not be described again herein.

Figure 6:
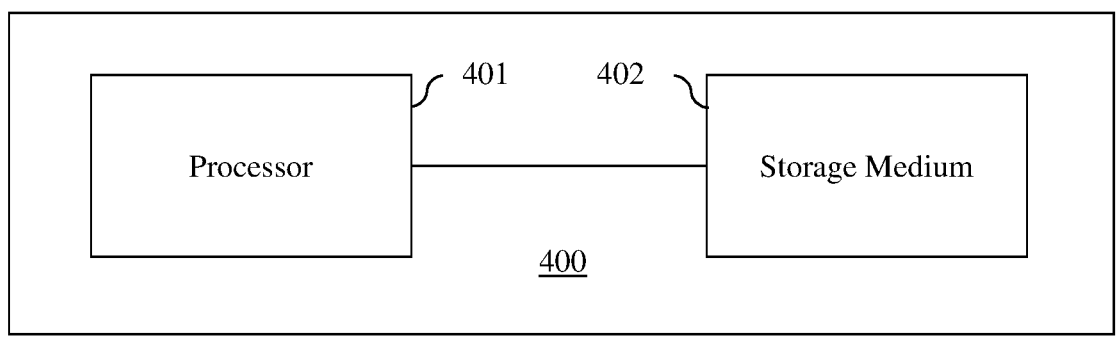
FIG. 6 is a schematic structural diagram of an electronic equipment according to an embodiment of the present application.

In addition, embodiments of the current application also provide an electronic equipment, wherein the electronic equipment can be a smartphone, a tablet computer, a robot, etc., comprising at least one sensor. As shown in FIG. 6, an electronic equipment 400 includes a processor 401 and a memory 402. The processor 401 is electrically connected to the memory 402.

The processor 401 is a control center of the electronic equipment 400, connects various parts of the entire electronic equipment using various interfaces and circuits, and performs various functions of the electronic equipment and processes data by running or loading an application stored in the memory 402 and calling data stored in the memory 402, thereby comprehensively monitoring the electronic equipment.

In this embodiment, the processor 401 in the electronic equipment 400 loads instructions corresponding to processes of one or more applications into the memory 402 according to the following steps, and the processor 401 runs the applications stored in the memory 402 to carry out various functions as follows:

An application to be optimized in the electronic equipment is determined through a system process.

A count of interface switches of the application to be optimized is obtained.

When the count of interface switches of the application to be optimized is greater than a predetermined count, a data volume of the file of the application to be optimized is obtained.

When the data volume of the file is greater than a preset threshold, optimization is performed on the file of the application so as to achieve optimization of the application to be optimized.

The electronic equipment can implement the steps in any embodiment of the application optimization method provided in the embodiment of the present application and, therefore, the electronic equipment can achieve the benefits of the application optimization methods provided in the embodiments of the present invention, which are detailed in the aforementioned embodiments and will not be described again herein.

Figure 7:
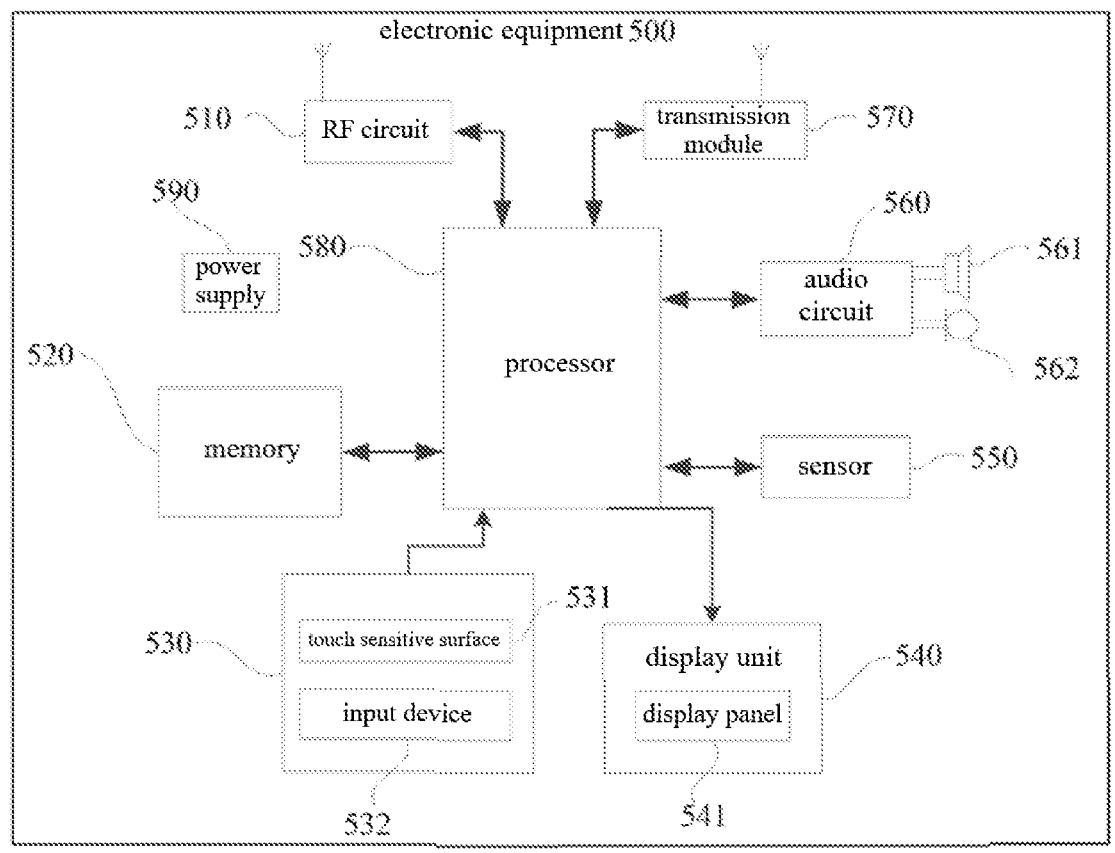
FIG. 7 is another schematic structural diagram of an electronic equipment according to an embodiment of the present application.

FIG. 7 is a specific block diagram of an electronic equipment according to an embodiment of the present invention; the electronic equipment may be used to implement the application optimization methods provided in the aforementioned embodiments. The electronic equipment 500 may be a smartphone, a tablet computer, a PC, or the like.

An RF circuit 510 is configured for receiving and transmitting electromagnetic waves, and performing conversion between the electromagnetic waves and electrical signals, so as to communicate with a communication network or other devices. The RF circuit 510 may include various existing circuit elements for performing these functions, such as an antenna, a radio frequency transceiver, a digital signal processor, an encryption/decryption chip, a subscriber identity module (SIM) card, memory, and so forth. The RF circuit 510 may communicate with various networks such as the internet, a corporate intranet, a wireless network, or with other devices over a wireless network. The wireless network may comprise a cellular telephone network, a wireless local area network, or a metropolitan area network. The wireless network may use various communication standards, protocols and technologies including, but not limited to, Global System for Mobile Communication (GSM), Enhanced Data Rages for GSM Evolution (EDGE), Wideband Code Division Multiple Access (WCDMA), Code Division Multiple Access (CDMA), Time Division Multiple Access (TDMA), Wireless Fidelity (WIFI) (e.g., IEEE802.11a, IEEE802.11b, IEEE802.1g and/or IEEE802.1n), Voice over Internet Protocol (VoIP), Worldwide Interoperability Microwave Access (Wi-Max), and other short message protocols, any other suitable communication protocols, and even protocols that have not yet been developed.

The memory 520 may be configured to store software programs and modules, such as the corresponding program instructions/modules in the aforementioned embodiments, and a processor 580 executes various functional applications and data processing by running the software programs and modules stored in the memory 520, that is, functions of taking a picture by the front camera, processing a taken image, and switching display colors of display contents on the display screen. The memory 520 may include high-speed random-access memory and may also include non-volatile memory, such as one or more magnetic storage devices, flash memory, or other non-volatile solid-state memory. In some examples, the memory 520 may further include memory located remotely from the processor 580, which may be connected to the electronic equipment 500 via a network. Examples of such networks include, but are not limited to, the internet, corporate intranets, local area networks, mobile communication networks, and combinations thereof.

The input unit 530 may be used to receive input numeric or character information and generate a keyboard, mouse, joystick, optical or trackball signal input related to user setting and function control. In particular, the input unit 530 may include a touch-sensitive surface 531, as well as other input devices 532. The touch-sensitive surface 531, also referred to as a touch display screen or a touch pad, may collect touch operations by a user on or near the touch sensitive surface 531 (e.g. operations by a user on or near the touch sensitive surface 531 using a finger, a stylus, or any other suitable object or attachment) and drive the corresponding connection device using a predetermined program. Alternatively, the touch sensitive surface 531 may comprise two parts, a touch detection and a touch controller. The touch detection device detects the touch direction of a user, detects a signal triggered by a touch operation, and transmits the signal to the touch controller; the touch controller receives touch information from the touch sensing device, converts the touch information into touch point coordinates, and sends the touch point coordinates to the processor 580, and can receive and execute commands sent by the processor 580. In addition, various types of the touch sensitive surface 531 may be implemented using various types of resistors, capacitors, infrared, and surface acoustic waves. The input unit 530 may comprise other input devices 532 in addition to the touch sensitive surface 531. In particular, other input devices 532 may include, but are not limited to, at least one of a physical keyboard, function keys (such as volume control keys, power buttons, etc.), a trackball, a mouse, a joystick, and the like.

The display unit 540 may be used to display information input by or provided to the user and various graphical user interfaces of the mobile terminal 500, wherein the graphical user interfaces may comprise graphics, text, icons, videos, and any combination thereof. The display unit 540 may include a display panel 541, and optionally, the display panel 541 may be configured in the form of a liquid crystal display (LCD), an organic light-emitting diode (OLED), or the like. Further, the touch-sensitive surface 531 can overlie the display panel 541 so that, when a touch operation is detected on or near the touch-sensitive surface 531, it is passed to the processor 580 for determining the type of touch event, whereupon the processor 580 provides a corresponding visual output on the display panel 541 according to the type of touch event. Although in the figures, the touch-sensitive surface 531 and the display panel 541 are shown as two separate components to implement input and output functions, in some embodiments, the touch-sensitive surface 531 and the display panel 541 can be integrated to implement input and output functions.

The electronic equipment 500 may also include at least one sensor 550, such as a light sensor, motion sensor, and other sensors. Specifically, the light sensor may include an ambient light sensor that may adjust the brightness of the display panel 541 according to the brightness of ambient light, and a proximity sensor that may generate an interruption when the lid is opened or closed. As a type of motion sensors, the gravity acceleration sensor can detect the magnitude of acceleration in each direction (generally, along three axes), can detect the magnitude and direction of gravity when a mobile phone is stationary, and can be configured for applications of recognizing the position of the mobile phone (such as horizontal and vertical screen switching, related games, magnetometer posture calibration), vibration recognition related functions (such as pedometer and tapping), and the like; as for other sensors such as a gyroscope, a barometer, a hygrometer, a thermometer, and an infrared sensor, which can be configured in the electronic equipment 500, detailed descriptions thereof are omitted.

An audio circuit 560, a speaker 561, and a microphone 562 may provide an audio interface between a user and the electronic equipment 500. The audio circuit 560 may transmit the electrical signal converted from the received audio data to the speaker 561, and convert the electrical signal into a sound signal by the speaker 561 for output; on the other hand, the microphone 562 converts the collected sound signal into an electric signal, is received by the audio circuit 560 and converted into audio data, and then outputs the audio data to the processor 580 for processing, and then to the RF circuit 510 for transmission to, for example, another terminal, or outputs the audio data to the memory 520 for further processing. The audio circuit 560 may also include an earbud jack to provide communication of a peripheral headset with the electronic equipment 500.

The electronic equipment 500, through a transmission module 570 (e.g., a WIFI module), may assist the user in receiving requests, sending messages, etc., which provides the user with wireless broadband internet access. Although the transmission module 570 is illustrated, it is understood that it does not belong to the essential constitution of the electronic equipment 500 and may be omitted entirely as needed within the scope not changing the essence of the invention.

The processor 580 is a control center of the electronic equipment 500, connects various parts of the entire cellular phone using various interfaces and lines, performs various functions of the electronic equipment 500 and processes data by operating or executing software programs and/or modules stored in the memory 520 and calling data stored in the memory 520, thereby performing overall monitoring of the electronic equipment. Optionally, the processor 580 may include one or more processing cores; in some embodiments, the processor 580 may integrate an application processor, which handles primarily the operating system, user interface, applications, etc., and a modem processor, which handles primarily wireless communications. It will be appreciated that the modem processor described above may not be integrated into the processor 580.

The electronic equipment 500 also includes a power supply 590 (e.g., a battery) that powers the various components and, in some embodiments, may be logically coupled to the processor 580 via a power management system that may perform functions such as managing charging, discharging, and power consumption. The power supply 590 may also include one or more DC or AC power sources, recharging systems, power failure detection circuitry, power converters or inverters, power status indicators, and any other components.

Although not shown, the electronic equipment 500 further includes a camera (e.g., a front camera, a rear camera), a BLUETOOTH module, and the like, which are not described in detail herein. Specifically, in this embodiment, the display unit of the electronic equipment is a touch screen display, the mobile terminal further includes a memory, and one or more programs, where the one or more programs are stored in the memory and configured to be executed by the one or more processors, and the one or more programs include instructions as follows.

An application to be optimized in the electronic equipment is determined through a system process.

An count of interface switches of the application to be optimized is acquired.

When the count of interface switches of the application to be optimized is greater than a predetermined count, the data volume of the file of the application to be optimized is acquired.

When the data volume is greater than a preset threshold, the file of the application to be optimized is optimized so as to achieve optimization of the application to be optimized.

In a specific embodiment, the above modules may be implemented as independent entities, or may be combined arbitrarily to be implemented as the same or several entities, and specific implementation of the above modules may refer to the foregoing method embodiments, which are not described herein again.

It will be understood by those skilled in the art that all or part of the steps of the methods of the above embodiments may be performed by instructions or by associated hardware controlled by the instructions, which may be stored in a computer readable storage medium and loaded and executed by a processor. To this end, the embodiment of the present invention provides a storage medium, in which a plurality of instructions are stored, and the instructions can be loaded by a processor to execute the steps of any embodiment of the application optimization method provided by the embodiment of the present invention.

Wherein the storage medium may include read only memory (ROM), random access memory (RAM), magnetic or optical disks, and the like.

Since the instructions stored in the storage medium may execute the steps in any embodiment of the application optimization method provided in the embodiments of the present invention, the beneficial effects that any application optimization method provided in the embodiments of the present invention can achieve may be achieved, for details, see the foregoing embodiments, and are not described herein again.

The foregoing detailed description is directed to an application optimization method, apparatus, storage medium, and electronic equipment provided in the embodiments of the present application, and specific examples are used herein to explain the principles and implementations of the present application, and the descriptions of the foregoing embodiments are only used to help understand the method and the core ideas of the present application; meanwhile, for those skilled in the art, according to the idea of the present application, there may be variations in the specific embodiments and the application scope, and in summary, the content of the present specification should not be construed as a limitation to the present application.

What is claimed is:

1. An application optimization method applicable to an electronic equipment, the method comprising:
    determining an application to be optimized in the electronic equipment through a system process;
    obtaining a count of interface switches of the application to be optimized;
    when the count of interface switches of the application to be optimized is greater than a predetermined count, obtaining a data volume of a file of the application to be optimized, wherein the file records classes and methods associated with interfaces that are called for the interface switches;
    and when the data volume is greater than a preset threshold, optimizing the file of the application to be optimized so as to achieve optimization of the application.

2. The application optimization method according to claim 1, wherein before the step of obtaining the count of interface switches of the application to be optimized, the method further comprising:
    detecting whether an interface called by the application to be optimized is different from a previously called interface through a process of the application to be optimized; and
    if a difference is detected, assessing an interface switching as happened in the application to be optimized, and incrementing the count of interface switches of the application to be optimized by 1; wherein the step of obtaining the count of interface switches of the application to be optimized further comprises: obtaining the count of interface switches of the application to be optimized through the system process.

3. The application optimization method according to claim 2, wherein the step of obtaining the count of interface switches of the application to be optimized through the system process comprises:
   accessing the process of the application to be optimized through the system process; and
   obtaining the count of interface switches of the application to be optimized through the process of the application to be optimized.

4. The application optimization method according to claim 2, wherein before the step of optimizing the file of the application to be optimized, further comprising: resetting the count of interface switches of the application to be optimized through the process of the application to be optimized.

5. The application optimization method according to claim 2, wherein the step of obtaining the count of interface switches of the application to be optimized through the system process comprises:
   when the process of the application to be optimized detects that the count of interface switches of the application to be optimized is changed, obtaining the count of interface switches of the application to be optimized through the process of the application to be optimized; and
   passing the count of interface switches of the application to be optimized to the system process.

6. The application optimization method according to claim 1, wherein the optimizing the file of the application to be optimized comprises:
   calling an optimization interface through the system process;
   reading the file of the application to be optimized by utilizing the optimization interface; and
   optimizing the file of the application to be optimized.

7. The application optimization method according to claim 6, wherein before the step of calling the optimization interface through the system process, the method further comprising:
   detecting if a file in another application is in the middle of optimization, generating an optimization task for the file of the application to be optimized, and writing the optimization task into a waiting queue; and
   when optimization of the file in another application is identified as completed, obtaining the optimization task from the waiting queue, and proceeding to the step of calling the optimization interface through the system process.

8. The application optimization method of claim 1, wherein:
   the step of determining an application to be optimized in the electronic equipment comprises determining the application to be optimized in the electronic equipment from a list of applications pending optimization through the system process;
   after the step of optimizing the file of the application to be optimized, the method further comprises:
   obtaining an amount of available memory of the electronic equipment;
   deciding whether to continue optimizing an optimized application according to the amount of available memory of the electronic equipment;
   if it is decided not to continue optimizing the optimized application, removing an entry corresponding to the optimized application from the list of applications pending optimization.

9. The application optimization method of claim 8, further comprising:
   detecting if an instruction to remove the application to be optimized is received, removing an entry corresponding to the application to be optimized from the list of applications pending optimization based on the instruction to remove.

10. An electronic equipment comprising:
    a memory, configured to store instructions and data; and
    a processor, electrically connected to the memory, configured to perform an application optimization method comprising steps of:
    determining an application to be optimized in the electronic equipment through a system process;
    obtaining a count of interface switches of the application to be optimized;
    when the count of interface switches of the application to be optimized is greater than a predetermined count, obtaining a data volume of a file of the application to be optimized, wherein the file records classes and methods associated with interfaces that are called for the interface switches;
    and when the data volume is greater than a preset threshold, optimizing the file of the application to be optimized so as to achieve optimization of the application.

11. The electronic equipment according to claim 10, wherein before the processor executes the step of obtaining the count of interface switches of the application to be optimized, the processor further executes steps of:
    detecting whether an interface called by the application to be optimized is different from a previously called interface through a process of the application to be optimized; and
    if a difference is detected, assessing an interface switching as happened in the application to be optimized, and incrementing the count of interface switches of the application to be optimized by 1; wherein the step of obtaining the count of interface switches of the application to be optimized further comprises: obtaining the count of interface switches of the application to be optimized through the system process.

12. The electronic equipment according to claim 11, wherein when the processor executes the step of obtaining the count of interface switches of the application to be optimized through the system process, the processor further executes steps of:
    accessing the process of the application to be optimized through the system process; and
    obtaining the count of interface switches of the application to be optimized through the process of the application to be optimized.

13. The electronic equipment according to claim 11, wherein before the processor executes the step of optimizing the file of the application to be optimized, the processor executes a step of resetting the count of interface switches of the application to be optimized through the process of the application to be optimized.

14. The electronic equipment according to claim 11, wherein when the processor executes the step of obtaining the count of interface switches of the application to be optimized through the system process, the processor further executes steps of:

when the process of the application to be optimized detects that the count of interface switches of the application to be optimized is changed, obtaining the count of interface switches of the application to be optimized through the process of the application to be optimized; and passing the count of interface switches of the application to be optimized to the system process.

15. The electronic equipment according to claim 10, wherein when the processor executes the step of optimizing the file of the application to be optimized, the processor further executes steps of:

calling an optimization interface through the system process;

reading the file of the application to be optimized by utilizing the optimization interface; and optimizing the file of the application to be optimized.

16. The electronic equipment according to claim 15, wherein before the processor executes the step of calling the optimization interface through the system process, the processor executes steps of:

detecting if a file in another application is in the middle of optimization, generating an optimization task for the file of the application to be optimized, and writing the optimization task into a waiting queue; and when optimization of the file in another application is identified as completed, obtaining the optimization task from the waiting queue, and proceed to the step of calling the optimization interface through the system process.

17. The electronic equipment according to claim 10, wherein:

when the processor executes the step of determining the application to be optimized in the electronic equipment, the processor further executes a step of determining the application to be optimized in the electronic equipment from a list of applications pending optimization through the system process;

after the processor executes the step of optimizing the file of the application to be optimized, the processor further executes steps of:

obtaining an amount of available memory of the electronic equipment;

deciding whether to continue optimizing an optimized application according to the amount of available memory of the electronic equipment; and if it is decided not to continue optimizing the optimized application, removing an entry corresponding to the optimized application from the list of applications pending optimization.

18. The electronic equipment according to claim 17, wherein the processor further executes steps of:

detecting whether an instruction to remove the application to be optimized is received; and if the instruction to remove is received, removing an entry corresponding to the application to be optimized from the list of applications pending optimization based on the instruction to remove.

19. A non-transitory computer-readable storage medium, wherein the computer-readable storage medium comprises a plurality of instructions adapted to being loaded by a processor to perform an application optimization method comprising steps of:

determining an application to be optimized in an electronic equipment through a system process;

obtaining a count of interface switches of the application to be optimized;

when the count of interface switches of the application to be optimized is greater than a predetermined count, obtaining a data volume of a file of the application to be optimized, wherein the file records classes and methods associated with interfaces that are called for the interface switches; and when the data volume is greater than a preset threshold, optimizing the file of the application to be optimized so as to achieve optimization of the application.

\* \* \* \* \*